Patented June 16, 1942

2,286,752

UNITED STATES PATENT OFFICE 2,286,752

RESIN

Charles Joseph Mighton, Wilmington, Del., assignor to E. I. du Pont de Nemours & Company, Wilmington, Del., a corporation of Delaware No Drawing. Application March 11, 1940,
Serial No. 323,448

17 Claims. (Cl. 260—70)

This invention relates to new synthetic resins and more particularly to modified and improved urea-formaldehyde resins.

The products of the reaction and/or condensation of urea with formaldehyde are well known in the art. While these have many desirable properties they are subject to improvement. Thus Edgar and Robinson in U. S. Patent 2,191,957 disclose products of improved flexibility and toughness containing from ½ to one mol of monohydric alcohol per mol of urea in the condensation product. These resins are of great utility in the coating composition field and are soluble in organic solvents such as alcohols, ketones, esters, or in mixtures of aromatic hydrocarbons with these foregoing solvents. There is need, however, for resins having the toughness and flexibility of such resins but having different properties, for example, applicability from aqueous systems in such a manner as to render it possible to insolubilize the resin after application.

This invention has as an object the preparation of new types of resins. Another object is the preparation of resins applicable from aqueous solution. A further object is the preparation of basic resins soluble in dilute acid and insoluble in dilute alkali and in water. Another object is the provision of a process for making such resins. A further object is the preparation of resins suitable for use in coating compositions either of the aqueous or non-aqueous type. Other objects will appear hereinafter.

These objects are accomplished by the following invention of dilute-acid-soluble, water- and dilute-alkali-insoluble, resinous condensation products of primary and secondary aliphatic amines with urea-formaldehyde-alcohol condensation products and the process of making the same by the reaction of the amine with the condensation product.

In the process of the present invention, a primary or secondary amine, having at least one but not more than two hydrogens on the nitrogen and in which all the carbons directly attached to the nitrogen are aliphatic, i. e., any amine having at least one hydrogen on amino nitrogen attached only to hydrogen and aliphatic carbon is heated with a urea-formaldehyde alcohol condensation product and preferably a resin, which condensation product or resin is soluble in organic solvents such as ketones, alcohols, esters, and mixtures of the foregoing with aromatic hydrocarbons. The urea-formaldehyde-alcohol condensation product preferably has 0.5 to 1.0 ether linkage per urea residue in the condensation product. The product of reaction with the amine is a basic reacting resin which is soluble in dilute aqueous organic and inorganic acids of concentration equivalent to 5–10% aqueous acetic acid and insoluble in water and dilute alkalies, e. g., 1–10% aqueous sodium hydroxide and ammonia and also in general is soluble in alcohols.

In the process of the present invention, the condensation product, preferably resinous, is heated with the amine, preferably in the presence of a solvent, at elevated temperatures (i. e., 100–120° C.). Heating is continued for a period depending on the particular amine and resin used as well as on their molal ratio in the reaction mixture, until the resinous products are soluble in dilute aqueous acids such as, for example, 1–5% hydrochloric acid or 5–10% acetic acid. Preferably, the basic resinous products are isolated from any unreacted excess amine by either washing the reaction mixture with water, distillation under reduced pressure, or by precipitation from organic solvents. When solvents such as butyl or isobutyl alcohol are used in the reaction mixtures, the crude basic resins may often be conveniently isolated by boiling with water, and may be purified further by washing with acetone or other non-solvents.

The degree of solubility of these new amino resins in dilute aqueous acids is dependent not only upon the degree of reaction between the amine and original resin, but also upon the particular amine and urea-formaldehyde-alcohol resin interacted. In general, basic resins prepared from polyamines such as hexamethylenediamine are more readily soluble in dilute acetic acid than those obtained with monoamines. The solubility of these basic resins in organic solvents may differ markedly from that of the parent urea-formaldehyde-alcohol resins, and depends also upon the above-mentioned factors. Thus in the examples later, the basic resins are soluble in aliphatic alcohols but are generally insoluble in solvents such as acetone dioxan and butyl acetate in which the original urea-formaldehyde-alcohol resins dissolve.

Flowouts of the resins from organic solvents set up rapidly on baking to give clear, light-colored, hard, glossy films which are, in most cases, insoluble in organic solvents, and water. Baked films flowed from dilute aqueous acid solutions are likewise clear, light-colored, and hard and dissolve readily in water.

The more detailed practice of the invention is illustrated by the following examples, wherein parts given are by weight. There are of course many forms of the invention other than these specific embodiments.

*Example I*

Two hundred and sixty-five parts of a 60% solution of a urea-formaldehyde-isobutanol resin in isobutanol, prepared according to Example II of U. S. Patent 2,191,957, is heated with 58 parts of hexamethylenediamine for two hours at reflux temperature. The reaction product is an essentially colorless, viscous solution from which 158 parts of a solid resinous product are isolated by distilling off the isobutanol with steam. The crude basic resin so obtained may be purified further by dissolving in n-butyl or isobutyl alcohol, precipitating with acetone, filtering, and drying in vacuo. The purified resin is soluble in ethyl, n-butyl and isobutyl alcohol and insoluble in acetone, xylene, dioxan, and butyl acetate. It forms clear, mildly foaming solutions in 1% aqueous hydrochloric or 5% aqueous acetic acid from which the water-soluble acid salts of the resin may be precipitated with acetone. Flowouts of the resin from isobutanol solutions baked one hour at 120° C. give clear, light-colored, hard, glossy films which are insoluble in isobutanol.

Similar basic resins may be obtained by reacting hexamethylenediamine with urea-formaldehyde-n-butyl alcohol resins or urea-formaldehyde-isopropyl alcohol resins.

*Example II*

A mixture comprising 265 parts of a 60% solution of a urea-formaldehyde-isobutanol resin in isobutanol prepared as in Example II of U. S. Patent 2,191,957, and 103 parts of diethylenetriamine is heated at reflux temperature for two hours. The basic resinous product, soluble in alcohols but insoluble in water and acetone, is isolated and purified in the manner outlined in Example I. The white, solid basic resin dissolves in 2% aqueous hydrochloric acid to give clear solutions, and gives slightly cloudy, mildly foaming solutions in 5% aqueous acetic acid. Flowouts of the resin from isobutanol solution give clear, light-colored, hard, glossy film. The films soften when immersed in water but recover well on drying.

*Example III*

A mixture consisting of 145 parts of a 60% solution of a urea-formaldehyde-isobutanol resin in isobutanol and 60 parts of ethylenediamine is heated under a reflux at 117° C. for three hours. The reaction mixture is then diluted with acetone whereupon a solid, white, resinous material precipitates. The resin gives clear, mildly foaming solutions in 2% aqueous hydrochloric acid and somewhat cloudy, mildly foaming solutions in dilute acetic acid. The resin dissolves in isobutanol and flowouts from solution give clear, hard, glossy films on baking.

*Example IV*

Two hundred and sixty-five parts of a 60% solution of a urea-formaldehyde-isobutanol resin in isobutanol is refluxed for two hours with 73 parts of diethylamine. The straw colored, viscous, resin solution is miscible with dilute aqueous hydrochloric acid in which the original urea-formaldehyde-isobutanol resin coagulates and precipitates. The crude, white, solid basic resin is isolated from isobutanol and unreacted diethylamine by boiling the reaction mixture with water. The resin is soluble in acetone as well as isobutanol and gives clear solutions in 2% hydrochloric acid or glacial acetic acid. Somewhat cloudy solutions are obtained on diluting glacial acetic acid solutions of the resin with water. Baked films of the resin flowed from isobutanol solution are clear and hard.

*Example V*

To a partially resinified mass obtained by fusing 37 parts (0.25 mole) of the crystalline dimethylether of dimethylolurea as in U. S. Patent 2,201,926, is added with stirring 29 parts (0.25 mole) of hexamethylenediamine. The mixture is heated at approximately 100° C. until about 7 parts of methyl alcohol distil from the reaction mixture. The product, which is a soft, light-colored, solid resin, is washed with water to remove unreacted diamine. The resin so obtained dissolves readily in 5% aqueous acetic acid and in isobutyl alcohol. Flowouts of the resin from isobutanol solution on baking one hour at 100° C. give clear, light-colored, tough adhesive films which are insoluble in water and organic solvents.

Similar basic resinous materials are obtained when other dialkyl ethers of dimethylolurea such as the diethyl, diisopropyl and di-isobutyl ethers are treated with hexamethylenediamine or other amines in the above manner.

While the above examples disclose the preparation of basic resins from preformed urea-formaldehyde-isobutanol resins, any other urea-formaldehyde-alcohol resin may be used in the preparation of valuable water and alkali-insoluble, acid-soluble aminonitrogen containing resins. Thus, any resin obtained by the condensation of urea and formaldehyde with monohydric alcohols, for example, methyl, ethyl, propyl or isopropyl, normal butyl or isobutyl, amyl, benzyl, cyclohexyl, octyl alcohols, beta-methoxyethanol, beta-ethoxyethanol, or the like, or with polyhydric alcohols, for example, ethyleneglycol, diethyleneglycol, glycerol, or the like, which resins contain the alcohol in combined form, function satisfactorily for the purposes of this invention. Valuable products which are soluble in dilute acids but insoluble in water and aqueous alkali may be obtained by reacting primary or secondary amines with modified urea-formaldehyde-alcohol resins in which part or all of the combined urea is replaced by substituted ureas, such as alkyl, aryl and acyl ureas, thioureas, guanidine or substituted guanidines as described in U. S. Patent 2,191,957. Mixtures of two or more different urea-formaldehyde-alcohol resins may be used likewise.

In place of preformed urea-formaldehyde-alcohol resins, other urea-formaldehyde-alcohol condensation products may be used. Thus the ethers of dimethylolurea may be used as illustrated by Example 5. Any ether or mixture of ethers of di-methylolurea, for example, the mono- or di-methyl, ethyl, propyl, butyl or isobutyl ethers, and the like, may be used to give acid-soluble but water- and alkali-insoluble resins on reaction with amines.

It is preferable that the reaction mixtures comprising the amines and urea-formaldehyde-alcohol resins or other materials as described above contain no free or uncombined formaldehyde. Although the invention is operable with reaction mixtures containing traces of free formaldehyde, when substantial amounts of free formaldehyde are present, undesirable side reactions between the amine and formaldehyde are apt to occur. It is preferable, therefore, to exclude free formaldehyde from the reaction mixtures.

The invention is not limited to the use of the particular mono- or polyamines used in the examples. Any mono- or polyamine containing at least one primary or secondary amino nitrogen group wherein the nitrogen is attached only to hydrogen and aliphatic carbon will give dilute acid-soluble urea-formaldehyde-resins of the type described herein. Examples of amines which are suitable for use are mono-amines, e. g., the mono- or di-methyl, ethyl-, propyl-, isopropyl-, butyl-, isobutyl-, amyl-, cyclohexyl-, benzyl-, allyl- and methallyl amines and the like, polyamines, e. g., trimethylene-diamine, tetra-, penta-, hexa-, hepta-, or decamethylenediamines, diethylenetriamine, dihexamethylenetriamine, triethylenetetramine, and N-substituted polyamines such as N, N'-dimethylhexamethylenediamine, etc. Mixtures of two or more amines may be used also.

It is preferable to conduct the condensation of amines with urea-formaldehyde-alcohol resins in the presence of organic diluents, e. g., relatively high-boiling aliphatic alcohols such as propanol, n-butyl or isobutyl alcohol, etc. which act as solvents for both the reactants and products. The use of such solvents tends to reduce discoloration of the products and any tendency of the reactants or products to become insoluble during the reaction. In certain cases it is advantageous to conduct the reaction in diluents which act as solvents only for the reactants, the basic resins precipitating therefrom as they are formed. Such solvents are toluene, butyl acetate, amyl acetate, dioxan or toluene or xylene mixtures with ethyl acetate, amyl acetate or dioxan. However, it is not to be inferred from the above that the use of solvents in the initial reaction mixture is necessary, for under carefully controlled operating conditions as in Example V the reaction may be conducted in the absence of added solvents.

The concentration of amine in the initial reaction mixture may be varied over wide limits and products of varying degrees of acid solubility may be obtained. The solubility of the resinous products in dilute aqueous acids will depend on not only the initial ratio of amine to resin in the reaction mixture but also on the type of amine used and the particular urea-formaldehyde-alcohol resin employed. It is preferable that at least one mole equivalent of the amine per mole of combined alcohol in the urea-formaldehyde-alcohol resin be used in order to obtain resinous products which are readily soluble in dilute aqueous acids. Products of decreasing acid solubility are obtained when smaller amounts of amine are used. The use of a greater concentration of amine offers no particular advantage other than that of accelerating the rate of reaction. However, the resin and the amine may be reacted in any proportion sufficient to produce the desired acid-soluble product. In Example I, it was found that one part molecular weight of hexamethylenediamine is sufficient to cause three equivalent part molecular weights of the chosen urea-formaldehyde-isobutanol resin to become soluble in dilute aqueous acetic acid. In general, the preferred resinous products are soluble, with the formation of salts, in water-soluble mineral or organic acids, such acids being present in the form of aqueous solutions equivalent in concentration to 5-10% aqueous acetic acid.

Furthermore, the invention is not limited by the operating conditions as set forth in the examples. The temperature and pressure can be varied over wide limits and equally valuable products obtained. The reaction can be conducted conveniently in most cases at atmospheric pressure, preferably at temperatures of approximately 100° C. However, subatmospheric or superatmospheric pressures and temperatures ranging from 50-150° C. can be employed with satisfactory results. The period of reaction required to give the desired products will vary with the operating conditions, the reactants and their ratios.

The resins of this invention have a wide variety of uses. Their most valuable application is in coating compositions which may range in character from simple solutions of the basic resins in organic solvents to more complex solutions in dilute aqueous acids. In dilute acid solutions, the resins are valuable as dispersing and/or emulsifying agents and may be used as such in coating compositions comprising aqueous emulsions or dispersions of oil, waxes, natural or synthetic resins, or pigments and the like. Such aqueous dispersions or emulsions may contain auxiliary agents such as mold or mildew inhibitors, wetting agents, antioxidants, plasticizers, insecticides, adhesives, and the like. The amino resins may be used, therefore, either alone or in combination with other materials in aqueous or organic solutions as coating compositions for metal, wood, brick, cement, plaster, textiles, cloth and fabrics, transparent films, paper and glass, etc. They may be used as "anchor" coats on cellulosic film-forming materials for other water-repellent finishes, as dye assistants, and as stabilizers for rubber hydrochloride or other materials which liberate acids on aging.

Among the advantages of this invention is the discovery of a process whereby a series of water and acid-insoluble urea-formaldehyde-alcohol resins may be converted by a simple reaction with primary or secondary aliphatic amines into resins which are insoluble in water but dissolve in solutions of dilute aqueous acids. The invention provides a method of preparing a unique series of acid-soluble resins which can be used in a wide variety of applications in which acid-insoluble resins are less suitable.

The above description and examples are intended to be illustrative only. Any modification of, or variation therefrom which conforms to the spirit of the invention is intended to be included within the scope of the claims.

What is claimed is:

1. A resinous product, soluble in dilute acid and insoluble in dilute alkali and water, of the condensation, with alcohol evolution, of an amine wherein each nitrogen is attached only to members of the class consisting of aliphatic carbon and hydrogen, wherein there is at least one hydrogen on amino nitrogen and wherein the molecule, apart from amino nitrogen and hydrogen attached thereto, is hydrocarbon, with a condensation product of formaldehyde, an urea and an alcohol.

2. A resinous product, soluble in dilute acid and insoluble in dilute alkali and water, of the condensation, with alcohol evolution, of an amine wherein each nitrogen is attached only to members of the class consisting of aliphatic carbon and hydrogen, wherein there is at least one hydrogen on amino nitrogen and wherein the molecule, apart from amino nitrogen and hydrogen attached thereto, is hydrocarbon, with a condensation product of formaldehyde, urea and an alcohol.

3. A resinous product, soluble in dilute acid and insoluble in dilute alkali and water, of the condensation, with alcohol evolution, of an amine wherein each nitrogen is attached only to members of the class consisting of aliphatic carbon and hydrogen, wherein there is at least one hydrogen on amino nitrogen and wherein the molecule, apart from amino nitrogen and hydrogen attached thereto, is hydrocarbon, with a condensation product of formaldehyde, urea and a monohydric alcohol.

4. A resinous product, soluble in dilute acid and insoluble in dilute alkali and water, of the condensation, with alcohol evolution, of an amine wherein each nitrogen is attached only to members of the class consisting of aliphatic carbon and hydrogen, wherein there is at least one hydrogen on amino nitrogen and wherein the molecule, apart from amino nitrogen and hydrogen attached thereto, is hydrocarbon, with a condensation product of formaldehyde, urea and a monohydric alcohol, having 0.5 to 1.0 mol combined alcohol per mol of urea in the formaldehyde-urea-alcohol condensation product.

5. A resinous product, soluble in aqueous acetic acid of a concentration within the range 5–10%, insoluble in water and in aqueous sodium hydroxide of a concentration within the range 1–10%, of the condensation, with alcohol evolution, of an amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, with a condensation product of formaldehyde, urea and an aliphatic alcohol having 0.5 to 1.0 mol combined alcohol per mol of urea in the formaldehyde-urea-alcohol condensation product.

6. A resinous product, soluble in aqueous acetic acid of a concentration within the range 5–10%, insoluble in water and in aqueous sodium hydroxide of a concentration within the range 1–10%, of the condensation, with alcohol evolution, of an aliphatic amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, with a condensation product of formaldehyde, urea, and an aliphatic alcohol having 0.5 to 1.0 mol combined alcohol per mol of urea in the formaldehyde-urea-alcohol condensation product.

7. A resinous condensation product as in claim 6 wherein the aliphatic alcohol is isobutanol.

8. A resinous product, soluble in aqueous acetic acid of a concentration within the range 5–10%, insoluble in water and in aqueous sodium hydroxide of a concentration within the range 1–10% of the condensation, with alcohol evolution, of an ether of dimethylolurea with an aliphatic amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon.

9. Process which comprises heating an amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, with a condensation product of formaldehyde, an urea and a monohydric alcohol at 50–150° C. until an alcohol is evolved from the reactants and until a resin soluble in 5% aqueous acetic acid is obtained.

10. Process which comprises heating an aliphatic amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, with a condensation product of formaldehyde, an urea and a monohydric alcohol at 50–150° C. until an alcohol is evolved from the reactants and until a resin soluble in 5% aqueous acetic acid is obtained.

11. Process which comprises heating an aliphatic amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, and a condensation product of formaldehyde, an urea and a monohydric alcohol, having 0.5 to 1.0 mol combined alcohol per mol of urea, at 50–150° C. until an alcohol is evolved from the reactants and until a resin soluble in 5% aqueous acetic acid is obtained.

12. Process which comprises heating, in an organic diluent, an aliphatic amine wherein each nitrogen is attached only to members of the class consisting of aliphatic carbon and hydrogen, wherein there is at least one hydrogen on amino nitrogen, and wherein the molecule, apart from amino nitrogen and hydrogen attached thereto, is hydrocarbon, and a condensation product of formaldehyde, an urea and a monohydric alcohol, having 0.5 to 1.0 mol combined alcohol per mol of urea, at 50–150° C. until an alcohol is evolved from the reactants and until a resin soluble in 5% aqueous acetic acid is obtained.

13. A resinous product, soluble in dilute acid and insoluble in dilute alkali and water, of the condensation, with alcohol evolution, of an aliphatic polyamine wherein each nitrogen is attached only to members of the class consisting of aliphatic carbon and hydrogen, wherein there is at least one hydrogen on amino nitrogen and wherein the molecule, apart from amino nitrogen and hydrogen attached thereto is hydrocarbon, with a condensation product of formaldehyde, urea and a monohydric aliphatic alcohol having 0.5 to 1.0 mol combined alcohol per mol of urea.

14. A resinous product, soluble in dilute acid and insoluble in dilute alkali and water, of the condensation, with alcohol elimination, of hexamethylene diamine with a urea-formaldehyde-isobutanol condensation product having 0.5 to 1.0 mol combined isobutanol per mol of urea.

15. A resinous product, soluble in dilute acid and insoluble in dilute alkali and water, of the condensation, with alcohol elimination, of diethylenetriamine with a urea-formaldehyde-isobutanol condensation product having 0.5 to 1.0 mol combined isobutanol per mol of urea.

16. A resinous product, soluble in dilute acid and insoluble in dilute alkali and water, of the condensation, with alcohol evolution, of an aliphatic monoamine wherein each nitrogen is attached only to members of the class consisting of aliphatic carbon and hydrogen, wherein there is at least one hydrogen on amino nitrogen and wherein the molecule, apart from amino nitrogen and hydrogen attached thereto is hydrocarbon, with a condensation product of formaldehyde, urea and a monohydric aliphatic alcohol having 0.5 to 1.0 mol combined alcohol per mol of urea.

17. A resinous product, soluble in dilute acid and insoluble in dilute alkali and water, of the condensation, with alcohol elimination, of diethylamine with a urea-formaldehyde-isobutanol condensation product having 0.5 to 1.0 mol combined isobutanol per mol of urea.

CHARLES JOSEPH MIGHTON.